United States Patent [19]

Perry

[11] 4,196,568
[45] Apr. 8, 1980

[54] MULCHING MOWER

[76] Inventor: Roger O. Perry, 4923 Hoover Dr., Charlotte, N.C. 28213

[21] Appl. No.: 2,614

[22] Filed: Jan. 11, 1979

[51] Int. Cl.² .................... A01D 35/26; A01D 55/18
[52] U.S. Cl. ...................................... 56/13.8; 56/255
[58] Field of Search ................... 56/255, 13.3, 13.4, 56/13.8, 14.7, 16.9

[56] References Cited

U.S. PATENT DOCUMENTS

| | | | |
|---|---|---|---|
| 2,701,942 | 2/1955 | Caldwell et al. | 56/13.3 |
| 2,760,327 | 8/1956 | Boree | 56/13.4 |
| 2,809,488 | 10/1957 | Sewell | 56/13.8 |
| 2,843,991 | 7/1958 | Poehls | 56/13.3 |
| 2,956,386 | 10/1960 | Niemann | 56/13.8 |
| 3,129,549 | 4/1964 | Stauffer | 56/14.7 |
| 4,057,952 | 11/1977 | Brokaw | 56/16.9 |

*Primary Examiner*—Russell R. Kinsey
*Attorney, Agent, or Firm*—Bell, Seltzer, Park & Gibson

[57] ABSTRACT

A rotary mower is provided with a housing penetrated by a shaft mounted on a vertical axis for rotation relative to the housing. A cutting blade is fixed to the shaft for rotation relative to the housing, and the shaft and the cutting blade are driven by a prime mover connected to the shaft outside the mower housing. According to the invention, a mulching blade is mounted on the shaft above the cutting blade and within the housing for rotation relative to the shaft and the housing, and a transmission operative connects the motive means and the mulching blade for rotating the later coaxially with and in a direction opposite from that of the cutting blade. The transmission comprises upper and lower wheels or pulleys encircling the shaft axis respectively above and within the housing and respectively connected to the shaft and the mulching blade, and a common endless pliable element or belt is trained about and extends between and in engagement with the wheels or pulleys for transmitting driving force from the shaft to the mulching blade.

10 Claims, 7 Drawing Figures

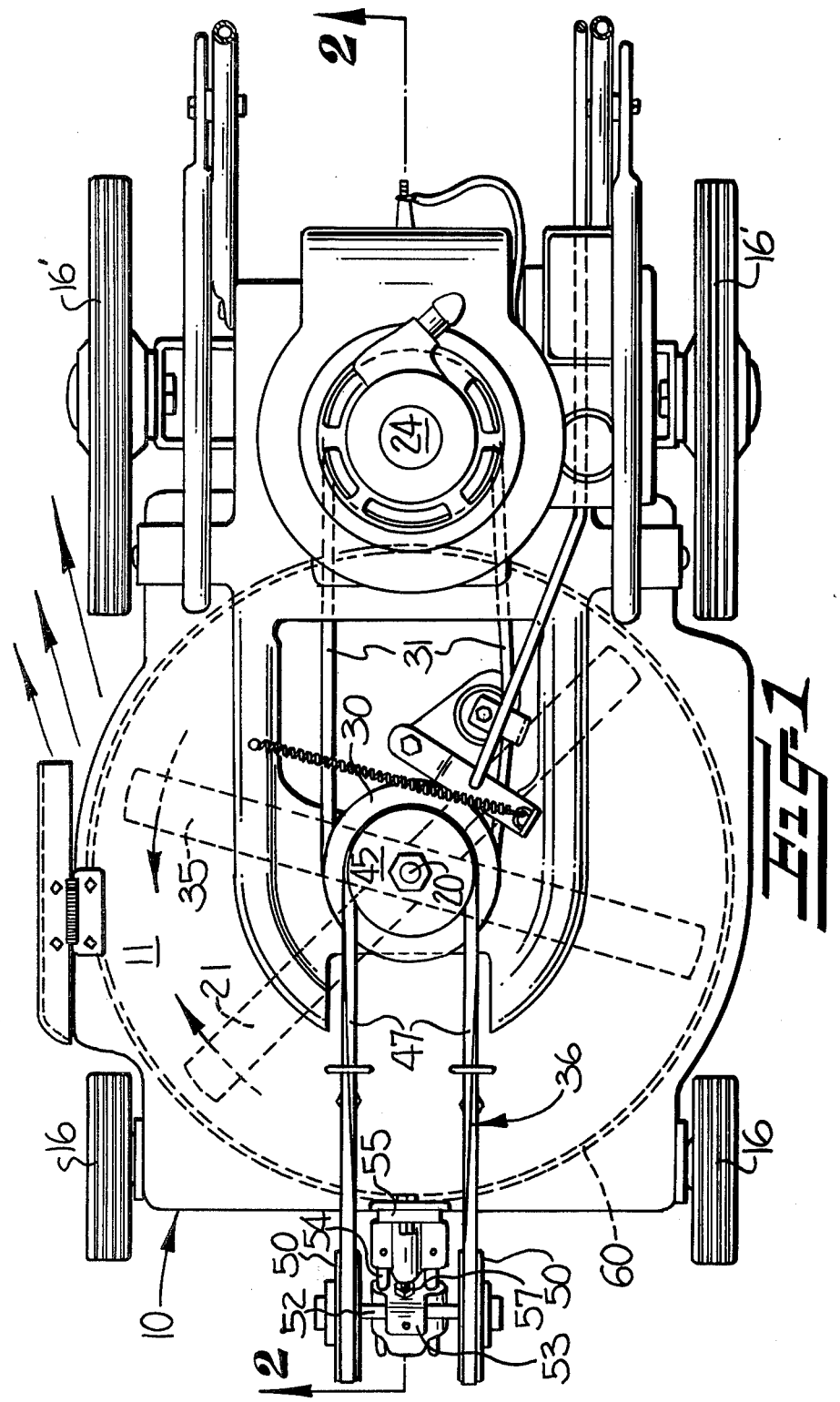

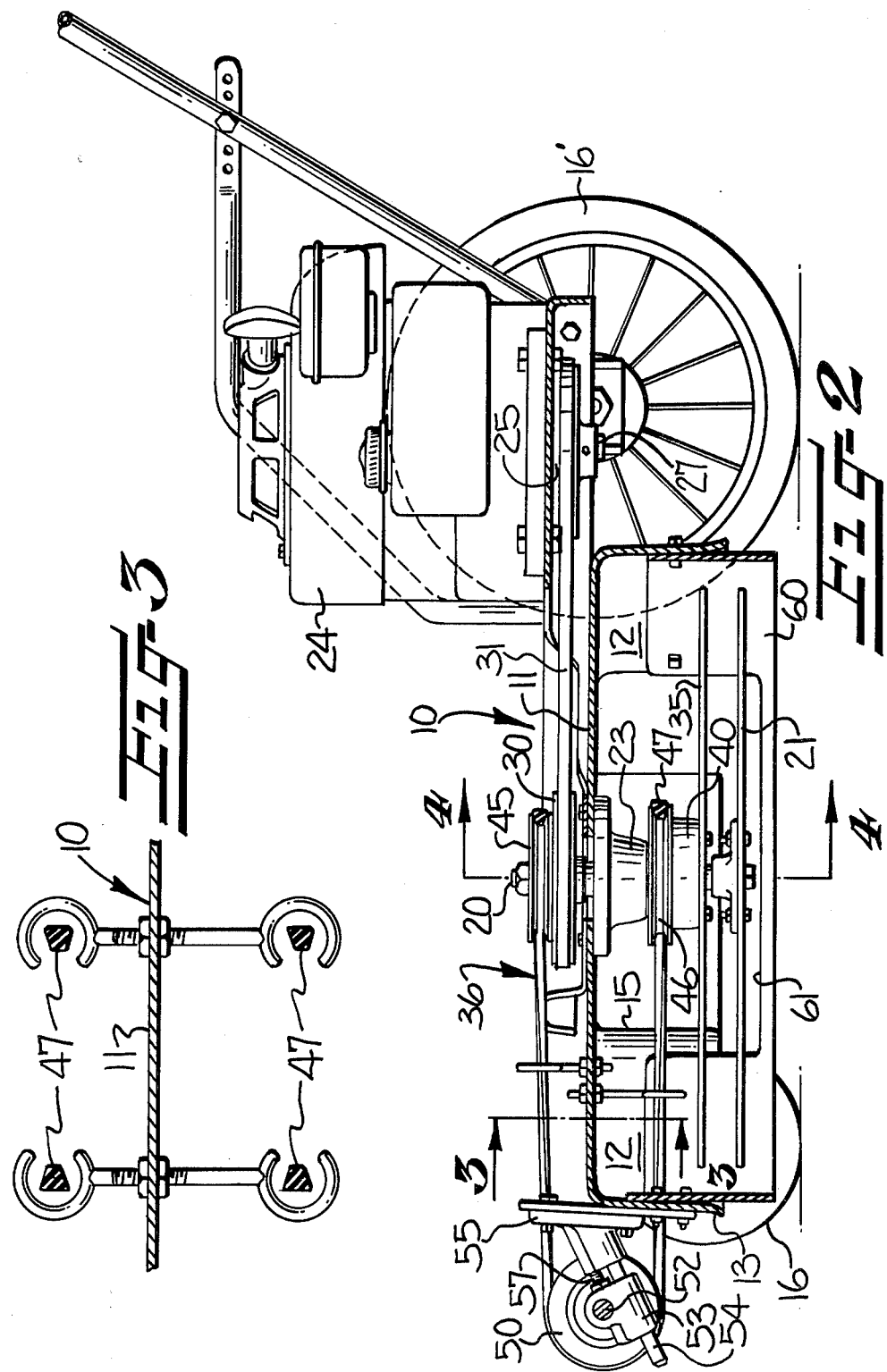

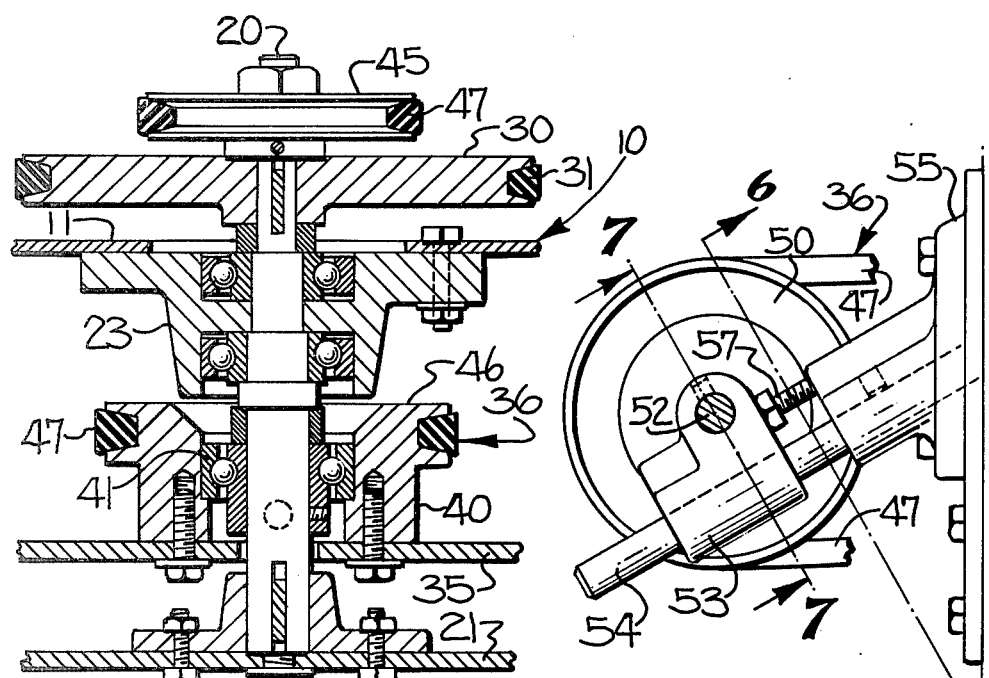
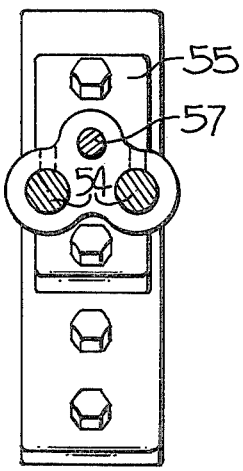
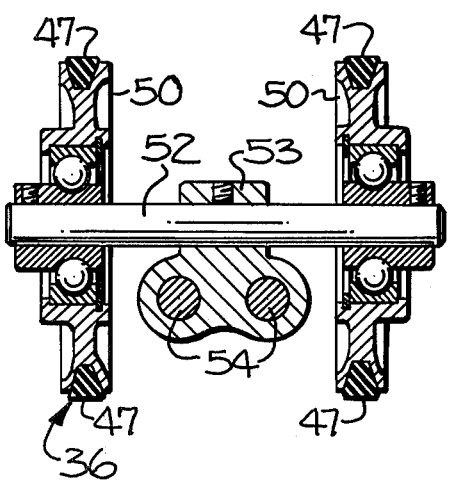

MULCHING MOWER

FIELD OF THE INVENTION

This invention relates to power mowers and more particularly to an improved rotary mower especially adapted for mulching grass clippings, leaves and other vegetation.

BACKGROUND OF THE INVENTION

Rotary mowers are in common use for mowing lawns and, as is well known in the art, some rotary mowers are especially constructed or equipped with special blades and/or other mulching attachments for mulching or shredding the material being cut during mowing. The present invention is particularly concerned with improvements in rotary mowers of the type equipped with a rotary mulching blade or blades in addition to the usual rotary cutting blade. Such type of mower is disclosed, for example, in Niemann U.S. Pat. No. 2,956,386, wherein a pair of vertically spaced rotary coaxial mulching blades are disposed rearwardly of a rotary cutting blade within a common mower housing. The use of vertically spaced coaxial blades or set of blades for cutting and/or mulching vegetation is further disclosed in other U.S. patents, such as, Sewell Pat. No. 2,809,488; Bovee Pat. No. 2,760,327; Whitney Pat. No. 2,734,327; and Pohels Pat. No. 2,843,991, for example. The vertically spaced coaxial blades or sets of coaxial blades disclosed in each of the aforementioned patents are driven to rotate in a common direction.

A rotary mower having coaxial sets of lower and upper cutting blades which rotate in opposite directions from each other is disclosed in Stauffer U.S. Pat. No. 3,129,549, wherein the upper set of cutting blades is adapted to rotate in shearing relation to the lower set of cutting blades in a horizontal plane so as to produce scissor-like cutting actions. The lower and upper sets of blades of the latter patent are respectively fixedly mounted on lower portions of a vertical shaft and a hollow hub encircling the shaft. The shaft and hub extend upwardly through a wheeled framework, are mounted for rotation in a relatively complicated bearing arrangement, and have respective upper portions with respective coaxial pulleys thereon, which pulleys are engaged by respective upper and lower runs of a driven common endless belt. Such an arrangement for driving the lower and upper cutting blades in opposite directions has drawbacks, such as, only a relatively small segment of each of the latter pulleys; e.g., substantially less than 180 degrees thereof, is engaged by the respective run of the belt in any given instant, thus requiring that the belt be highly tensioned in order to prevent slippage of such runs on the coaxial pulleys. Also, with both runs of the endless belt being positioned above the base framework of the mower as in the Stauffer patent, the thus exposed upper and lower runs of the endless belt, and the exposed upwardly projecting idler pulley supporting means associated therewith, present a constant hazard to an operator.

BRIEF SUMMARY OF THE INVENTION

It is therefore an object of this invention to provide an improved rotary mulching mower having oppositely rotating lower and upper blades with driving means therefor so constructed and arranged as to avoid the above and other defects of the known prior art.

In accordance with the present invention the above and other objects are achieved by providing a rotary mower whose housing has a blade therewithin fixed on a shaft penetrating the housing on a vertical axis, wherein mulching blade means is also mounted on the shaft above the blade and within the housing for rotation relative to the shaft and the housing. Means are drivingly connected to the shaft outside the housing for rotating the shaft and the blade in one direction, and transmission means operatively connects the driving means and the mulching blade means for rotating the mulching blade means coaxially with and in a direction opposite to the blade. The transmission means comprises upper and lower wheel means or pulleys encircling the axis of the shaft respectively above and within the housing and being respectively connected to the shaft and the mulching blade means, with a common endless pliable element trained about and extending between and engaging the wheel means for transmitting rotational driving force from the shaft to the mulching blade means.

BRIEF DESCRIPTION OF THE DRAWINGS

Some of the objects and advantages of the invention having been stated, others will appear as the description proceeds when taken in connection with the accompanying drawings, in which—

FIG. 1 is a top plan view of a typical mower illustrating a preferred embodiment of the improved mulching apparatus of the present invention in association therewith;

FIG. 2 is a longitudinal vertical sectional view through the mulching mower, mostly in elevation, and being taken substantially along line 2—2 in FIG. 1;

FIG. 3 is an enlarged fragmentary vertical sectional view taken substantially along line 3—3 in FIG. 2;

FIG. 4 is an enlarged fragmentary vertical sectional view taken substantially along line 4—4 in FIG. 2;

FIG. 5 is an enlarged fragmentary detail of the idler pulley mounting means shown in the lefthand portion of FIG. 2; and FIGS. 6 and 7 are fragmentary sectional views taken along the respective lines 6—6 and 7—7 in FIG. 5.

DETAILED DESCRIPTION

Referring more specifically to the drawings, there will be observed in FIGS. 1 and 2 a typical rotary mower comprising a wheeled housing 10 provided with wall means which may include a top wall 11 from which substantially vertical side walls 12 and a substantially vertical front wall 13 depend. As is usual, one of the side walls 12 is provided with a discharge opening 15 therein for discharge of the grass clippings, leaves and the like from within the housing 10 during use of the mower. Front and rear ground wheels for supporting housing 10 are indicated at 16, 16'.

A main shaft 20 penetrates housing 10 on a vertical axis and is mounted for rotation relative to the housing 10 about the axis. A cutting blade 21 is fixed to the shaft 20 for rotation therewith within the housing 10, and means are drivingly connected to the shaft 20 outside the housing 10 and above the blade 21 for rotating the shaft 20 and the blade 21 in one direction. Accordingly, it will be observed in FIG. 4 that a medial portion of the shaft 20 is rotatably supported in a bearing bracket 23 suitably secured to and depending from the top or upper wall 11 of housing 10 and through which the upper portion of shaft 20 extends. The means connected to the shaft outside the housing for rotating the shaft and blade in one direction may take the form of a motive means or conventional engine 24 suitably secured upon a rear portion of housing 10 and having a pulley 25 fixed on its downwardly extending output or drive shaft 27. A similar pulley 30 is keyed on an upper portion of the main shaft 20 above the housing 10, and an endless belt 31 is trained about and extends between and in engagement with the pulleys 25, 30 for transmitting rotation from the engine drive shaft 27 to the main shaft 20. Alternatively, the engine may be mounted directly above and in alignment with the main shaft 20 and coupled thereto in any appropriate way.

In accordance with this invention, a mulching blade means 35 is mounted on shaft 20 above blade 21 and within housing 10 for rotation relative to the shaft 20 and the housing 10, and improved transmission means, generally designated at 36 and to be later described, is provided for operatively connecting the driving means 24 and the mulching blade means 21 for rotating the mulching blade means coaxially with and in a direction opposite from that of the cutting blade 21.

As shown in FIGS. 2 and 4, the mulching blade means 35 is mounted on shaft 20 for rotation relative to shaft 20 by means of a hub member 40 rotatably supported on the shaft 20. The hub member 40 may be pressed onto or otherwise secured on the outer race of an internal antifriction bearing means 41, the inner race of the antifriction bearing means 41 being suitably secured to the substantially vertical shaft 20 extending therethrough. As shown, the mulching blade means 35 is also loosely penetrated by the shaft 20 and is suitably secured to the lower surface of the hub member 40. The mulching blade means 35 and hub member 40 are spaced above the cutting blade 21 and are disposed within the housing 10.

The transmission means 36 comprises upper and lower wheel means 45, 46 respectively, encircling the axis defined by the substantially vertical shaft 20. The upper and lower wheel means 45, 46 are disposed respectively above and within the housing and are respectively connected to the shaft 20 and the mulching blade means 35. In the illustrated, preferred, embodiment, with particular reference to FIG. 4, it will be observed that the upper and lower wheel means 45, 46 may take the form of grooved pulleys, with the pulley 45 being suitably secured on an upper portion of the main shaft 20 above the housing 10, and with the lower pulley 46 being suitably secured to or formed integral with the upper portion of the hub member 40. A common endless pliable element, shown in the form of an endless belt 47, is trained about and extends between and in engagement with the wheel means or pulleys 45, 46 for transmitting rotational driving force from shaft 20 to the mulching blade means 35.

Means are provided for guiding the opposing run portions of the belt 47 in its course between the upper and lower pulleys 45, 46 so that the upper and lower portions of the endless belt 47 engage approximately one half of the periphery of each of the upper and lower pulleys 45, 46 at all times during the transmission of rotation from the shaft 20 to the mulching blade means 35 for aiding in assuring such frictional contact between the upper and lower portions of the endless belt 47 and the respective pulleys 45, 46 as to avoid unintentional slippage of the belt on the corresponding pulleys. Such guide means is effective for directing upper run portions of the endless belt 47 from the upper pulley 45 over and beyond one side or front portion of the housing 10 and then inwardly through suitable openings provided in the housing 10 and then within the housing 10 to the lower pulley 46. To this end, the upper run portions of the endless belt 47 preferably extend forwardly from the upper pulley 45 and outwardly of the front wall 13 of housing 10, where the opposing run portions of the endless belt 47 are trained about half-way around and in engagement with idler wheel means shown in the form of a pair of grooved pulleys mounted on a common substantial horizontal axis and being rotatably supported by the housing 10.

In this instance, the idler pulleys 50 are rotatably mounted on opposite end portions of a substantially horizontally disposed jack shaft 52, a medial portion of which is suitably secured in an adjustable bracket 53 guidingly supported on a pair of elongate guide elements or guide rods 54. The guide rods 54 extend in substantially parallel relationship and extend rearwardly from the adjustable bracket 53 where their rear portions are suitably secured to a support bracket 55 suitably secured to the housing 10. As shown in FIGS. 1 and 2, the support bracket 55 is suitably secured to the substantially vertical front wall 13 of housing 10, and if desired, the guide rods 54 may be arranged so that they are inclined upwardly and rearwardly with respect to the adjustable bracket 53.

An adjustment screw or adjustable abutment 57 is threadedly mounted in the forward portion of the support bracket 55 (FIGS. 2 and 5), and the forward end of the adjustable abutment 57 abuts the adjustable bracket 53. Thus, it is apparent that the adjustable abutment 57 facilitates the adjustment of the adjustable bracket 53 along the guide rods 54 to insure that the endless belt 47 of the transmission means 36 may be maintained under the desired tension for efficient operation of the transmission means 36.

It may be desirable, although not entirely necessary, that an existing mower be modified to accommodate the mulching blade means 35 and the transmission means 36 of the present invention. Accordingly, it may be assumed that the conventional ground wheels 16, 16' of the mower in FIG. 2 occupy a relatively low position with respect to the housing 10 with the mulching blade occupying that position which would normally be occupied by the cutting blade if the mower had not been modified as contemplated. Under such conditions, it can be appreciated that the lower extremities of the housing 10 would be spaced an undesirably excessive distance above the ground, thus virtually nullifying the suction effect being produced by the rotary cutting blade 21 in the lifting of loose vegetation from the ground to be mulched by the mulching blade means 35.

Therefore, in order to accommodate the cutting blade 21 at its relatively low level relative to the lower edges of the wall means of housing 10, and to also inhibit the undesirable accumulation and packing of mulched vegetation in the usual inner corner areas of the housing 10, a generally circular cowl skirt 60 is carried by and positioned in housing 10 and substantially surrounds cutting blade 21 and the mulching blade means 35. The cowl skirt 60 may be suitably secured at its upper portion to the inner surfaces of the substantially vertical wall means of the mower housing 10 with the cowl skirt 60 extending downwardly within the housing 10 and having a lower portion thereof extending below the lower extremity of the vertical wall means such as that indicated at 12 and 13 in FIG. 2.

The cowl skirt 60 may be formed of a relatively thin but rigid metal and is provided with a discharge opening 61 in one side thereof which registers with the discharge opening 15 of the mower housing 10 for permitting outward discharge of mulched grass clippings and the like from within the housing and from within the cowl skirt 60. It should be noted that, by extending the lower portion of the cowl skirt 60 downwardly a substantial distance below the lower extremity of the housing 10, not only is a wall thus provided which surrounds both the cutting blade 21 and the mulching blade means 35, but only a relatively small space need exist between the lower edge of the cowl skirt 60 and the ground surface over which the mower is moved during the mowing and mulching operations, thus aiding in the effectiveness of the suction produced by the cutting blade 21 in the lifting of the loose vegetation from the ground to be mulched by the mulching blade means 35.

From the foregoing description, it can be seen that there is provided in combination with a rotary mower, mulching blade means 35 which is mounted on the shaft on which the grass cutting blade 21 is mounted and which mulching blade means is positioned above the cutting blade 21 and within the housing of the mower for rotation relative to the shaft and the housing, and wherein transmission means 36 operatively connects driving means 24 and the mulching blade means 35 for rotating the mulching blade means coaxially with and in a direction opposite from that of the cutting blade 21. Further, it can be seen that the transmission means 36 comprises upper and lower wheel means 45, 46 encircling the shaft axis respectively above and within the housing 10 and respectively connected to the shaft 20 and the mulching blade means 35, with a common endless pliable element or belt 47 trained about and extending between and engaging the wheel means 45, 46 for transmitting rotational driving force from the shaft 20 to the mulching blade means 35.

In the drawings and specification there has been set forth a preferred embodiment of the invention and, although specific terms are employed, they are used in a generic and descriptive sense only and not for purposes of limitation.

That which is claimed is:

1. In a rotary mower having a housing, a shaft penetrating said housing on a vertical axis and mounted for rotation relative to said housing about said axis, a blade fixed to said shaft for rotation therewith within said housing, and means drivingly connected to said shaft outside said housing and above said blade for rotating said shaft and said blade in one direction, the combination therewith of mulching blade means mounted on said shaft above said blade and within said housing for rotation relative to said shaft and said housing, and transmission means operatively connecting said driving means and said mulching blade means for rotating said mulching blade means coaxially with and in a direction opposite to said blade, said transmission means comprising upper and lower wheel means encircling said axis respectively above and within said housing and respectively connected to said shaft and said mulching blade means, and a common endless pliable element trained about and extending between and engaging said wheel means for transmitting rotational driving force from said shaft to said mulching blade means.

2. A lawn mower according to claim 1 wherein said endless pliable element is an endless elastomeric material belt.

3. A lawn mower according to claim 1 wherein said upper and lower wheel means are grooved pulleys and said endless pliable element is an endless belt engaging said grooved pulleys.

4. A lawn mower according to claim 1 further comprising a generally circular cowl skirt carried by and positioned in said housing and surrounding said blade and said mulching blade means, said cowl skirt having a discharge opening therein for outward discharge of mulched grass clippings and the like therefrom.

5. A lawn mower according to claim 1 wherein said housing includes an upper wall means and substantially vertical wall means extending downwardly from said upper wall means, idler wheel means rotatably supported by said housing and positioned outwardly of said vertical wall means, said endless pliable element having a pair of substantially parallel upper run portions extending from said upper wheel means over and partially around said idler wheel means, and said pliable element also having a pair of substantially parallel lower run portions extending from said idler wheel means through said vertical wall means to said lower wheel means.

6. A lawn mower according to claim 5 wherein said endless pliable element is an endless elastomeric material belt.

7. A lawn mower according to claim 5 wherein said upper and lower wheel means are grooved pulleys and said endless pliable element is an endless belt engaging said grooved pulleys.

8. A lawn mower according to claim 5 further comprising a generally circular cowl skirt carried by and positioned in said housing and surrounding said blade and said mulching blade means, said cowl skirt having a discharge opening therein for outward discharge of mulched grass clippings and the like therefrom.

9. A lawn mower according to claim 5 wherein said housing is provided with ground wheels so positioned that the lower extremity of said vertical wall means is spaced a substantial distance above ground during use of the mower, a cowl skirt carried by said housing and surrounding said blade and said mulching blade means, said cowl skirt having a discharge opening therein for outward discharge of mulched material therefrom, and said cowl skirt extending downwardly from within said housing and having a lower portion thereof extending below the lower extremity of said vertical wall means.

10. In a rotary mower having a wheeled housing provided with a substantially vertical front wall, a shaft penetrating said housing on a vertical axis and mounted for rotation relative to said housing about said axis, a blade fixed to said shaft for rotation therewith within said housing, and means drivingly connected to said shaft outside said housing and above said blade for rotating said shaft and said blade in one direction, the combination therewith of mulching blade means mounted on said shaft above said blade and within said housing for rotation relative to said shaft and said housing, and transmission means operatively connecting said driving means to said mulching blade means for rotating said mulching blade means coaxially with and in a direction opposite from that of said blade, said transmission means comprising upper and lower pulleys encircling said axis respectively above and within said housing and fixed with respect to said shaft and said mulching blade means, respectively, a common endless belt trained about and extending between and engaging said pulleys for transmitting rotational driving force from said shaft to said mulching blade means, a pair of idler pulleys outside housing and engaged by said endless belt for guiding the same in its course between said upper and lower pulleys, and means mounting said idler pulleys on said housing with said idler pulleys positioned forwardly of said housing front wall.

* * * * *

UNITED STATES PATENT AND TRADEMARK OFFICE
CERTIFICATE OF CORRECTION

PATENT NO. : 4,196,568
DATED : April 8, 1980
INVENTOR(S) : Roger O. Perry

It is certified that error appears in the above-identified patent and that said Letters Patent are hereby corrected as shown below:

In the Abstract, Line 10, the word "operative" should be - operatively -.

Column 6, Line 63, after the word "outside" insert - said -.

Signed and Sealed this

Twenty-second Day of July 1980

[SEAL]

Attest:

SIDNEY A. DIAMOND

Attesting Officer Commissioner of Patents and Trademarks